Jan. 15, 1924.
H. W. CONNELL
1,480,995
DIFFERENTIAL MECHANISM
Filed Aug. 26, 1921
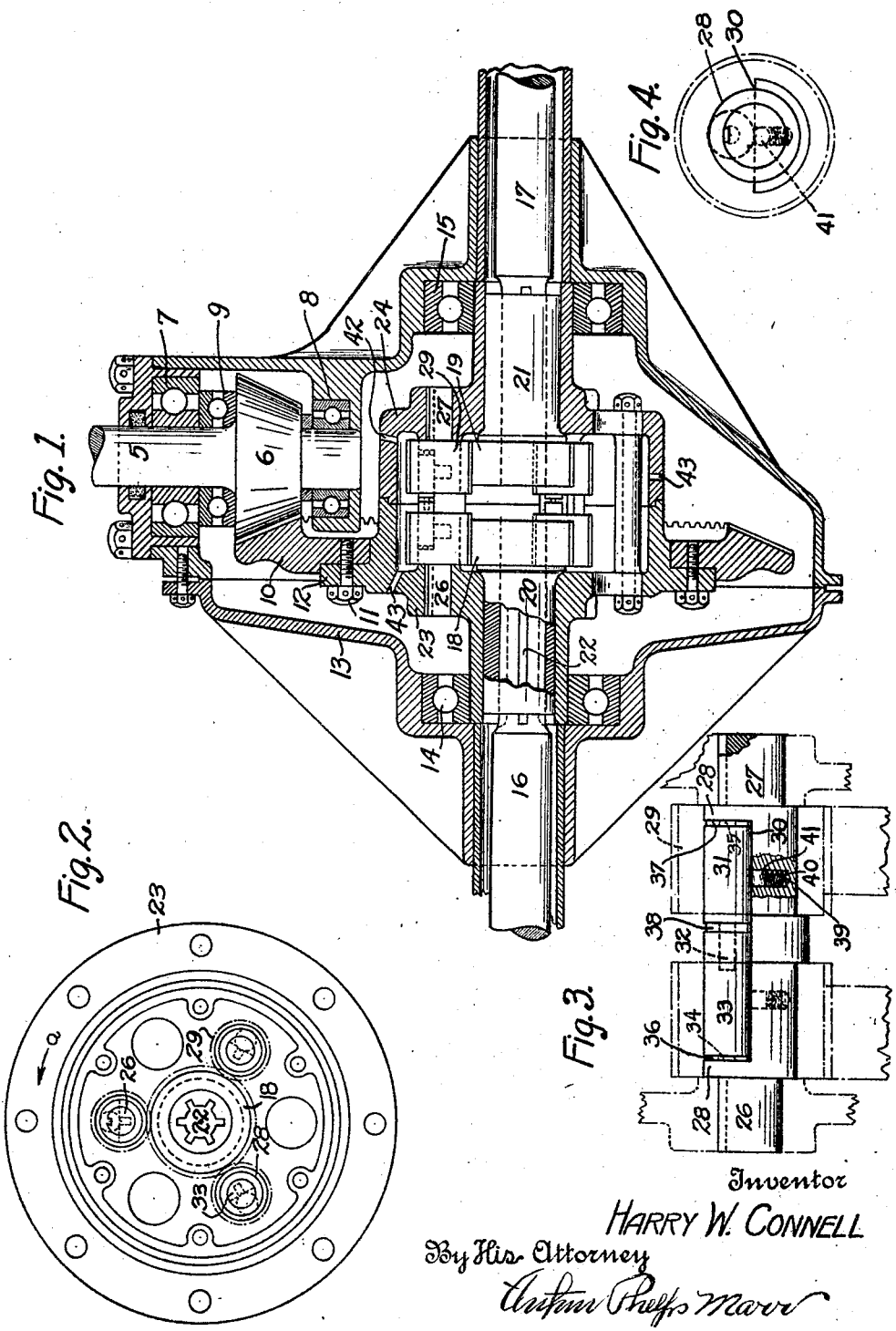
Inventor
HARRY W. CONNELL
By His Attorney
Arthur Phelps Marr Patented Jan. 15, 1924.

1,480,995

UNITED STATES PATENT OFFICE.

HARRY W. CONNELL, OF LOWVILLE, NEW YORK.

DIFFERENTIAL MECHANISM.

Application filed August 26, 1921. Serial No. 495,459.

*To all whom it may concern:*

Be it known that I, HARRY W. CONNELL, a citizen of the United States, and resident of town of Lowville, county of Lewis, State of New York, have invented certain new and useful Improvements in Differential Mechanism.

The device the subject of this invention is intended as a driving member between parallel operating parts such as the driving wheels of an automobile and while the device is quite similar in construction, shape and size to the ordinary planetary type geared differential, it has certain functions peculiar to itself and during the course of this specification I may find it necessary to refer to the geared differential for the purpose of comparison and for the reason that the planetary differential is so well known and its operation so well understood that by comparison it is believed that the description of this device can be materially shortened and made more readily understandable.

The principal objects of this invention are to eliminate the possibility of miring an automobile which occurs with a geared differential because of the ability of one traction wheel to travel in advance of the other.

To eliminate side swipe or skid which results from the fact that when turning a corner or describing a circle or a part thereof, the power is, in the ordinary practice, applied to the outer wheel of the driving pair, the one furthest from the axis of the circle or arc, and at the same time the inner wheel or the one on the shortest radius may stop completely or even rotate backard. These objectionable features are eliminated in the device described in this specification and the accompanying drawing should be referred to for a complete understanding of the specification which follows:

In the drawing:

Fig. 1 is a sectional view partly in elevation showing a complete assembling of my differential.

Fig. 2 is an end elevation of certain parts removed.

Fig. 3 is an enlarged view of certain important features.

Fig. 4 is an end view thereof.

Similar reference numerals indicate like parts in all the figures where they appear.

As some of the parts of my device are of ordinary shape and size and function in the ordinary manner or in the manner well known with differentials, I will refer to them but briefly, in many instances, merely by name or title and reference character.

At 5, I show a driving shaft, the shaft sometimes referred to as the longitudinal shaft, extending from the transmission to the differential. This shaft is provided with a pinion 6 and is supported on suitable bearings 7 and 8 and a thrust bearing 9. In mesh with the pinion 6 is a ring gear 10 secured by means of bolts 11 to a ring 12 which will be later referred to. Surrounding the ring gear and differential is a casing 13 having bearings 14 and 15 for the axel members 16 and 17 and at the inner end of each axel member is a gear as shown at 18 and 19. These gears being provided with rather long thimbles 20 and 21 into which the axles are introduced and retained by a standard spline as shown at 22. I provide a housing in two parts 23 and 24 within which is enclosed the gears of the differential and to which the ring gear 10 is secured by bolts 11 and in this housing I secure oppositely disposed pinion shafts. Three pairs of shafts are employed in the construction here shown. One pair being shown and indicated by the reference characters 26 and 27.

Upon each pinion shaft is an enlarged portion 28 which may be formed integral therewith and the pinion 29 fits closely upon this enlarged portion with freedom to rotate thereon and I prefer that the inner surface of the pinion and the outer surface of the enlargement 28 should be ground so that while the pinion may rotate upon the enlargement 28 no lost motion will be present therein.

I remove a part of the enlarged portion and thus form a shelf as shown at 30, the part removed being not quite ½ the diameter of the enlargement 28 and on the shelf 30 thus produced and between this shelf and the inner periphery of the gear 29 I place a roller.

As the pinions are arranged opposite in pairs, each pinion shaft and enlarged portion 28 will be similarly produced and arranged and within each pinion I place a roller. As described the rollers are made in pairs. The roller 31 having a projection 32 and the roller 33 having a socket into which the projection 32 is free to enter. Small projections 34 and 35 may be provided upon the rollers to receive fiber washers 36 and 37 and I may arrange a fiber washer 38 between the rollers 31 and 33.

On the shelves 30, produced as a part of the enlarged portions 28 of the pinion shafts 26 and 27 I produce a perforation or well 39, arranging therein a spring 40 and plunger 41. The plunger bears against its adjacent roller retaining the roller in engagement with the inner periphery of the adjacent pinion. The rollers 31 and 33 should also be hardened and ground as are the pinions 29 for although little or no wear will occur between these parts I desire that their fit and contact surface be not subject to change.

I will now describe briefly the operation of this device and it will be noted that I employ three pairs of pinions, 29. These pinions are in mesh with the gears 18 and 19 which are by means of the thimbles 20 and 21 secured to the axis 16 and 17 and therefore when the ring gear 10 is rotated the pinions 29 would rotate around gears 18 and 19 except for the fact that a movement of the ring gear in the direction of the arrow a, (see Fig. 2) will cause the rollers 31 and 33 to move in the same direction and become wedged between their pinions and the shelf 30 upon which they rest. In this position they will, upon the continuation of the rotation of the ring stop the independent movement of the pinions and will cause them to transmit their power to the larger gears 18 and 19, thus rotating the shafts or axels 16 and 17.

While in this condition, both of the traction wheels which are presumed to be secured upon the axis 16 and 17, are driving wheels of the vehicle, if the device is employed on an automobile, and while either traction wheel may advance at a speed greater than the driving speed, both cannot so advance at the same time. The advancement of one wheel is accomplished by its associated pinion rotating in a non-wedging direction, in relation to the position of its locking roller, the position of the roller being maintained by the locked condition of the other roller of the pair, with its associated pinion. Should both traction wheels attempt to travel forward both the rollers would pass through the transverse axial center and engage at the other side of their pinions, which while virtually the reverse driving position, serves in this instance, such as when a vehicle is going down-hill to lock the traction wheels to the driving mechanism.

In turning a corner the outer wheel of a vehicle, or the traction wheel, traveling the greatest arc, may run ahead of the directly opposite wheel, the movement of the wheel causing the intermediate gear to advance, centering its respective roller or causing it to assume what may be termed a zero or neutral position allowing the intermediate gear to rotate freely upon its support and demonstrating the important principle that the power is under all conditions applied to the wheel in traction.

It will appear quite obvious after due consideration that this device operates entirely automatically and in either direction with equal facility. It will also appear equally obvious how the device overcomes the objectionable features set forth in the preamble of this specification.

I may employ any number of pinions 29, I prefer however, that the number should be 3 or more for purely mechanical reasons. I may and do provide suitable means such as the oil grooves 42 and 43 for assuring proper lubrication, and all of the dimensions and sizes of my device may be varied at will.

I call particular attention to the fact that the engagement or disengagement of the rollers with their respective pinions and shelves occurs during the time that the device or parts are passing through the period of least applied force, for if the parts are engaged and one traction wheel attempts to advance, the first action is to relieve that wheel of all driving strain, this is true of all portions of the rollers.

I also call particular attention to the fact that the rollers themselves do not actually transmit the load but merely cause the pinions to engage their supporting studs with sufficient force or power to prevent their independent rotation and when the roller is engaged or wedged, the pinion and its support serve as and actually become a frozen clutch.

Having described my invention what I claim is:

1. A driving gear and means for rotating it and a driven gear, a plurality of pinions operated by said driving gear and in mesh with said driven gear though rotatable thereon and means within said pinion for preventing the rotation of said pinions.

2. In a differential, a driving gear, a plurality of driven gears and a plurality of intermediate gears capable of rotation around said driven gears and means within said intermediate gears for causing them to rotate said driven gears.

3. In a differential, a driving gear, a plurality of driven gears and a plurality of intermediate gears capable of independent rotation and means within said intermediate gears to prevent independent motion thereof.

4. In a differential, a driving gear a plurality of driven gears and a plurality of intermediate gears adapted to be rotated around said driven gears by said driving gear, and means comprising an independently movable roller, operated by each said intermediate gear for preventing the rotation of the intermediate gear independent of its said adjacent driven gear.

5. In a differential, a driving gear, a driven gear and intermediate gears in mesh with said driven gears, means within the intermediate gears for supporting said gears, said means being secured to said driving gear and movable locking members arranged upon said supporting means and having their axis normally parallel with the axes of said intermediate gears.

6. In a differential, a driving gear, a driven gear and intermediate gears, means within the intermediate gears for supporting said gears and said means being secured to said driving gear and movable members arranged upon said supporting means and having their axis normally parallel with the axes of said intermediate gears, said members being free to be moved out of the vertically transverse axial line by the movement of said intermediate gears and means to prevent the independent movement of either of said members in relation to the other beyond the vertically transverse axial line of its gear.

7. In a differential, a driving gear, a plurality of driven gears, a plurality of intermediate gears capable of independent rotation around their adjacent driven gear and means for causing said intermediate gears to transmit the motion and power of said driving gear to said driven gear, said means comprising a locking member within each intermediate gear.

8. In a differential, a driving gear, a plurality of driven gears, a plurality of intermediate gears capable of independent rotation around their adjacent driven gear and means for causing said intermediate gears to transmit the motion and power of said driving gear to said driven gear, and said means comprising a wedging member within each said intermediate gear and each said wedging member being capable of independent movement.

9. In a differential, a driving gear, a plurality of driven gears, a plurality of intermediate gears capable of rotation around their adjacent driven gear and means for causing said intermediate gears to transmit the motion and power of said driving gear to said driven gear, said means comprising a wedging member within each said intermediate gear, said wedging members being capable of coordinate movement.

10. In a differential, a driving gear, a plurality of driven gears arranged in axial alignment, a plurality of intermediate gears for said driven gears and arranged in pairs the gears of each pair being in axial alignment and rollers within the intermediate gears, said rollers arranged in pairs in axial alignment, and each said roller being movable independent of the other roller of the pair and to a pre-determined degree.

11. In a differential, a driving member, a plurality of driven members, intermediate members adapted to transmit the motion from the driving member to the driven members said intermediate members being arranged in pairs in axial alignment and means adjacent to said intermediate means for controlling the independent movement of said intermediate means, said last mentioned means being arranged in pairs in axial alignment capable of independent movement to a pre-determined degree.

12. In a differential, a driving means, a driven means, rotatably supported intermediate means adapted to transmit motion from the driving means to the driven means and means within said intermediate means for preventing the axial rotation thereof, said means comprising a wedging means and means for retaining said wedging means in contact with said intermediate means.

13. In a differential a plurality of traction shafts, gears arranged thereon, intermediate gears in mesh therewith, a housing and means in said housing for supporting said intermediate gears, means upon said housing for supporting a driving gear and means within said intermediate gears for preventing the independent rotation thereof and causing the said intermediate gears to transmit the rotation of said housing to the first mentioned gears.

14. In a differential, a plurality of traction shafts, gears arranged thereon, intermediate gears in mesh therewith, a casing, means for supporting said intermediate gears upon said casing, means for rotating said casing, means within said intermediate gears for causing them to rotate the first mentioned gears, said means being adapted to prevent the rotation of said first mentioned gears at a rate of speed less than the speed of rotation of the casing.

15. In a differential, a plurality of traction shafts, gears arranged thereon, intermediate gears in mesh therewith, a casing, means for supporting said intermediate gears upon said casing, means for rotating said casing, means within said intermediate gears for causing them to rotate the first mentioned gears, said means being adapted to allow the rotation of either said first mentioned gears independently at a speed greater than the speed of rotation of the other first mentioned gear.

16. In a device of the character described, a driving member, a driven member and intermediate means and means for supporting said intermediate means and means within said intermediate means for causing said intermediate means to engage this supporting means to prevent the independent rotation thereof.

H. W. CONNELL.